United States Patent
Uenishi et al.

(10) Patent No.: US 7,427,817 B2
(45) Date of Patent: Sep. 23, 2008

(54) SMALL-SIZED MOTOR HAVING POLYGONAL OUTER SHAPE

(75) Inventors: Eiji Uenishi, Matsudo (JP); Nobuyuki Nemoto, Matsudo (JP)

(73) Assignee: Mabuchi Motor Co., Ltd., Chiba (JP)

( * ) Notice: Subject to any disclaimer, the term of this patent is extended or adjusted under 35 U.S.C. 154(b) by 0 days.

(21) Appl. No.: 11/677,806

(22) Filed: Feb. 22, 2007

(65) Prior Publication Data

US 2007/0200444 A1 Aug. 30, 2007

(30) Foreign Application Priority Data

Feb. 24, 2006 (JP) .............................. 2006-048698

(51) Int. Cl.
  *H02K 1/17* (2006.01)
  *H02K 21/26* (2006.01)
  *H02K 21/28* (2006.01)
(52) U.S. Cl. .................... 310/154.22; 310/154.21; 310/154.03; 310/154.14; 310/154.15; 310/40 MM
(58) Field of Classification Search ........... 310/40 MM, 310/154.01, 154.03, 154.07, 154.08, 154.12, 310/154.09, 154.13, 154.14, 154.15, 154.21, 310/154.22, 154.25, 154.26, 154.28
See application file for complete search history.

(56) References Cited

U.S. PATENT DOCUMENTS

| | | | | |
|---|---|---|---|---|
| 4,412,145 A | * | 10/1983 | Voss et al. | 310/154.15 |
| 4,453,097 A | * | 6/1984 | Lordo | 310/154.07 |
| 5,201,111 A | * | 4/1993 | Prohaska | 29/596 |
| 6,995,488 B1 | * | 2/2006 | Yamashita et al. | 310/154.21 |
| 2004/0061406 A1 | * | 4/2004 | Yokota et al. | 310/216 |
| 2007/0007838 A1 | * | 1/2007 | Kuroda | 310/154.21 |

FOREIGN PATENT DOCUMENTS

| | | | |
|---|---|---|---|
| EP | 1727259 A2 | * | 11/2006 |
| JP | 64-12455 | | 1/1989 |
| JP | 7-59322 | | 3/1995 |
| JP | 10201206 A | * | 7/1998 |
| JP | 2005-20914 | | 1/2005 |

OTHER PUBLICATIONS

Translation of JP 07059322 (dated: Mar. 3, 1995) (Yamaguchi Tadao et al.).*
Translation of JP 10201206 (date: Jul. 31, 1998) (Yui Katsuhiko).*

* cited by examiner

*Primary Examiner*—Darren Schuberg
*Assistant Examiner*—Alex W Mok
(74) *Attorney, Agent, or Firm*—McGlew & Tuttle, P.C.

(57) ABSTRACT

A small-sized motor having a polygonal outer shape includes four or more field magnets attached to the inner surface of a motor casing made of metal. A tubular portion of the motor casing is formed into a polygonal tubular shape such that flat side portions equal in number to field poles, and flat or curved corner portions equal in number to the field poles and each being located between the adjacent side portions are sequentially joined together. The field magnets have a smaller thickness at portions corresponding to the side portions of the motor casing and a larger thickness at portions corresponding to the corner portions of the motor casing. The field magnets are fixed while coinciding in center position with the corresponding corner portions of the motor casing and while being pressed against the corresponding corner portions of the motor casing from inside.

18 Claims, 9 Drawing Sheets

UTILIZATION OF PINS AND PROJECTIONS

PROJECTION PROVIDED ON MOTOR CASING

MAGNET

FIG. 6B

UTILIZATION OF PINS ONLY

MAGNET

FIG. 6C

DETAIL OF X

PIN

COMPARISON OF TOTAL MAGNETIC FLUX OF MOTOR—SAME CORE SIZE

| □18.3、CORE DIA. φ15 | φ20.0 CORE DIA. φ15 |
|---|---|
| TOTAL MAGNETIC FLUX OF MOTOR(Wb) ||
| 2550 | 2510 |

FIG. 10C

COMPARISON OF TOTAL MAGNETIC FLUX OF MOTOR—SAME MOTOR THICKNESS

| □18.3、CORE DIA. φ15 | φ18.3 CORE DIA. φ13 |
|---|---|
| TOTAL MAGNETIC FLUX OF MOTOR(Wb) ||
| 2550 | 1750 |

FIG. 11A

MOTOR HAVING SQUARE OUTER SHAPE
(PRESENT INVENTION)

FIG. 11B

MOTOR HAVING ROUND OUTER SHAPE
(PRIOR ART)

PRIOR ART

FIG. 12

SMALL-SIZED MOTOR HAVING POLYGONAL OUTER SHAPE

BACKGROUND OF THE INVENTION

1. Field of the Invention

The present invention relates to a small-sized motor having a polygonal outer shape for use in, for example, an air conditioner actuator or a motor-driven retractable mirror, and more particularly to a technique for mounting magnets for use as stator poles to the inner surface of a motor casing.

2. Description of the Related Art

Figure 10A:
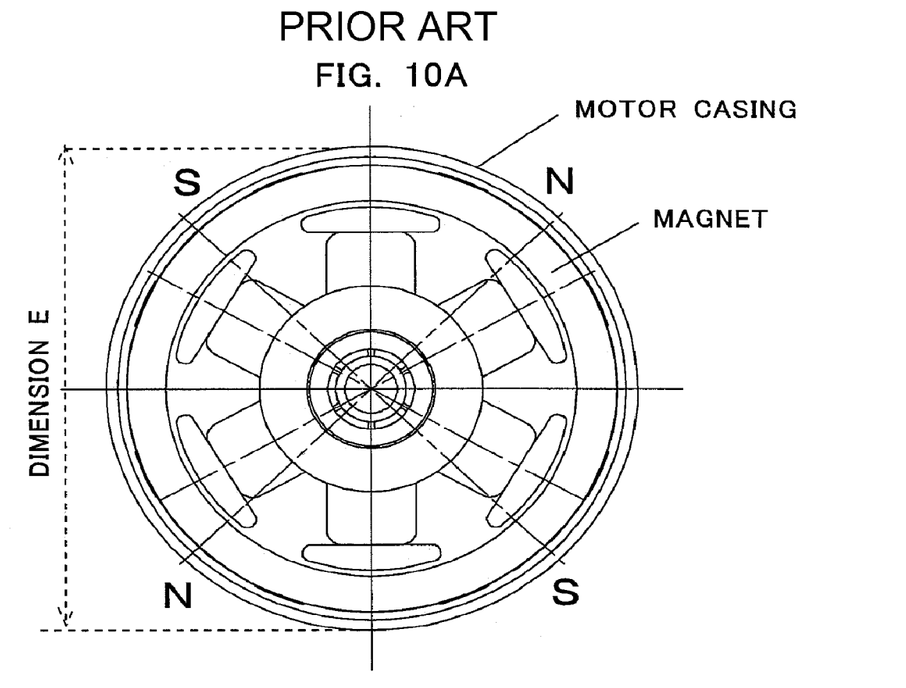
FIG. 10A is a sectional view of a conventional small-sized motor having a circular (round) outer shape in contrast to the small-sized motor of the present invention.

As shown in FIG. 10A, an ordinary small-sized motor is such that a motor casing assumes a circular (round) tubular shape. When such a motor having a round outer shape (hereinafter, may be called a round motor) is to be mounted in an apparatus or on a wiring board, a whirl-stop must be employed for preventing rotation of the motor. When a round motor is mounted in an apparatus, the round shape tends to be accompanied by wasted space within the apparatus. In order to avoid rotation of a motor in relation to a mounting surface or to improve space efficiency, there is known impartment of a square or higher polygonal outer shape to a motor.

Figure 7:
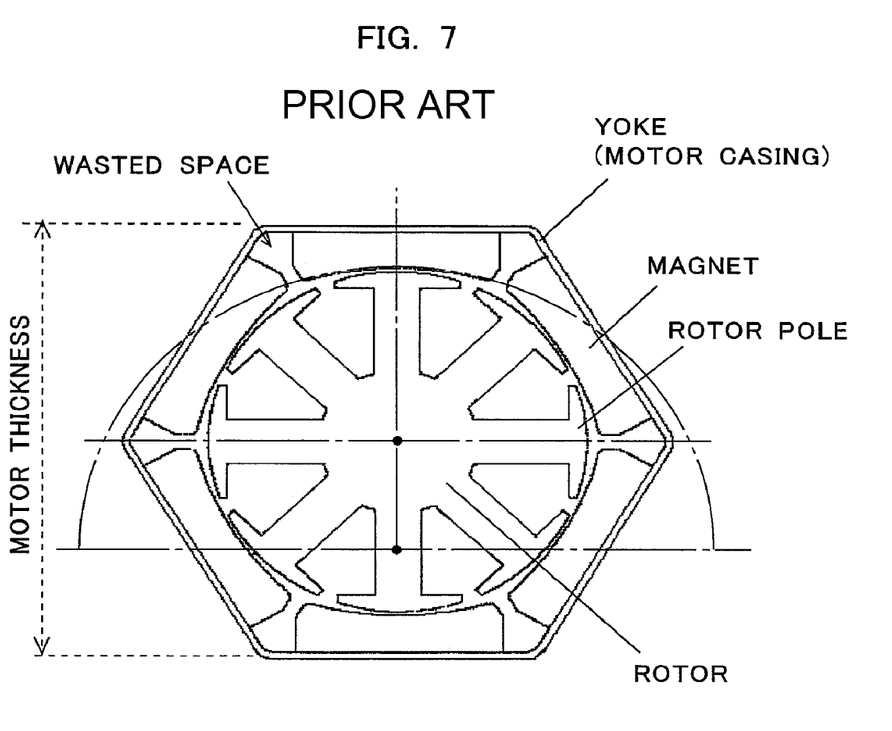
FIG. 7 is a sectional view showing the configuration of a conventional regular-polygonal motor (Japanese Patent Application Laid-Open (kokai) No. 2005-20914)

FIG. 7 shows the cross-sectional configuration of a conventional regular-polygonal motor (refer to Japanese Patent Application Laid-Open (kokai) No. 2005-20914). The illustrated regular-polygonal (hexagonal) motor is configured such that a tubular portion of a motor casing, which serves as a yoke, is formed into a regular-polygonal tubular shape and such that magnets serving as field poles (six poles) are attached to the respective inner surfaces of side portions of the motor casing, the side portions collectively forming a regular-polygonal tubular shape. In order to lower vibration of the side portions of the motor casing, the magnets are fixed to the respective side portions at the circumferential centers. A rotor having eight rotor poles is disposed radially inward of the magnets and is supported rotatably. Generally, individual magnets are shaped such that the radial clearance between the magnet and the outer circumferential surface of the rotor pole gradually increases from the circumferential center of the magnet toward the circumferentially opposite ends of the magnet. By virtue of this feature, the intensity of magnetic field is gradually weakened toward the opposite ends of the individual magnets, thereby avoiding an abrupt change in the intensity of magnetic field, which would otherwise result from rotation of the rotor. Thus, cogging torque can be lowered.

In order to lower cogging torque, the magnets of FIG. 7 are formed such that the distance between the magnet and the rotor is increased from the circumferential center of the magnet toward the circumferentially opposite ends of the magnet (along the circumference line shown by the alternate-long-and-short-dash line in FIG. 7). Even so, circumferentially opposite end portions of the magnet are still thicker than a circumferentially central portion of the magnet. Also, increasing the distance apparently causes a drop in motor performance. Furthermore, wasted spaces are formed between the magnets. Thus, as viewed on the cross section, disposing the magnets in the respective circumferentially central regions of the sides of the yoke raises the following problem: the magnets can be neither reduced in size nor arranged efficiently; consequently, the motor thickness (distance between diametrically opposed sides of the polygonal yoke) is increased, resulting in a failure to reduce the size of the motor.

Figure 8:
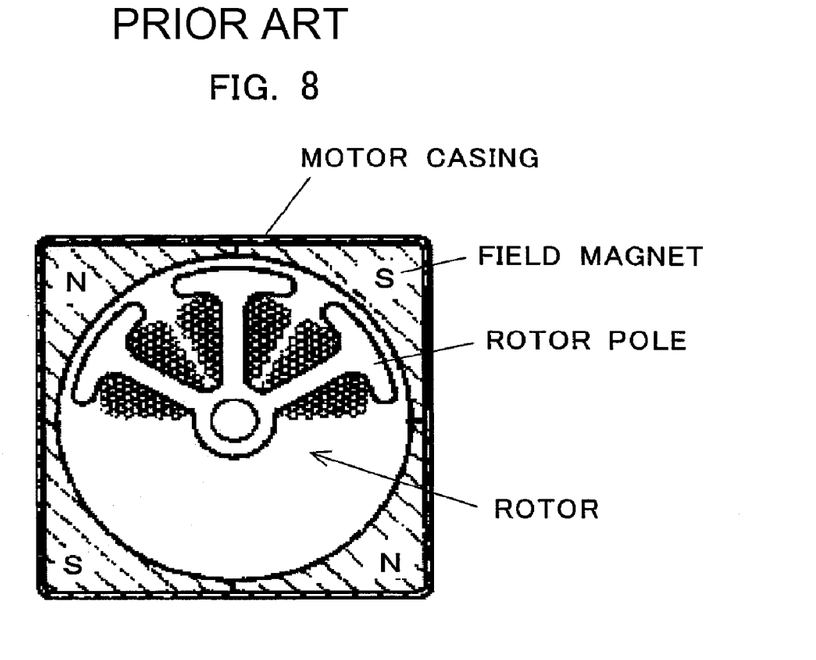
FIG. 8 is a sectional view of a conventional motor having a field magnet whose field poles are disposed at corresponding corners of a motor casing (Japanese Patent Application Laid-Open (kokai) No. H7-59322)
Figure 9:
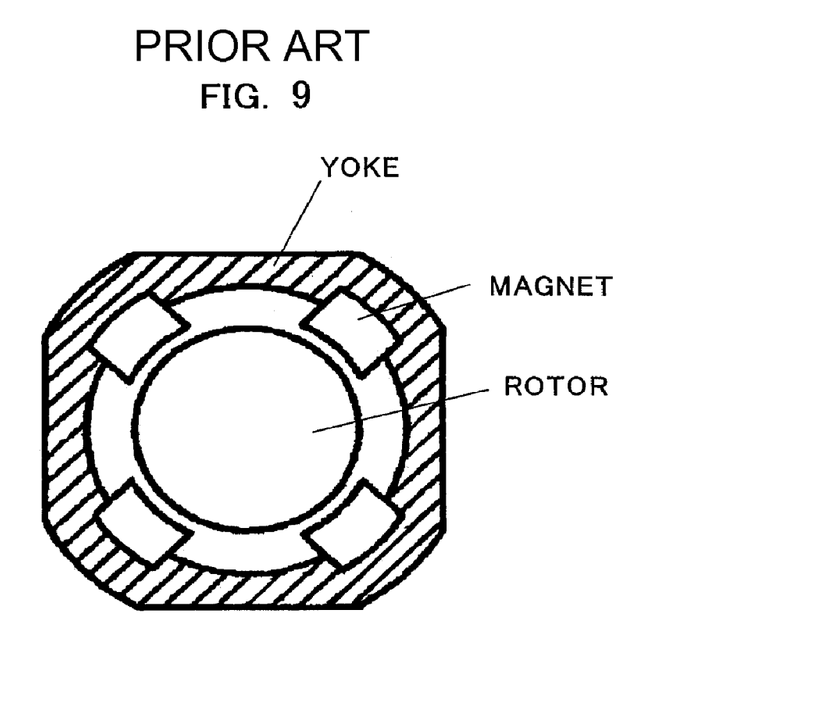
FIG. 9 is a sectional view of a conventional motor in which magnets are disposed at respective corners of a motor casing (Japanese Utility Model Application Laid-Open (kokai) No. S64-12455)

In order to cope with the above problem, there is known a configuration in which, as viewed on the cross section of the yoke, the magnets are disposed at respective corners defined by adjacent sides of a polygonal yoke. FIGS. 8 and 9 are sectional views showing conventional motors in which the magnets are disposed at the respective corners defined by the adjacent sides (refer to Japanese Patent Application Laid-Open (kokai) No. H7-59322 and Japanese Utility Model Application Laid-Open (kokai) No. S64-12455). In FIG. 8, the motor casing has a square cross section, and a 4-pole field magnet magnetized with alternating north and south is disposed in the motor casing. This field magnet is magnetized such that the centers of magnetic poles are located at the respective corners defined by the adjacent sides of the yoke. A rotor having three rotor poles (arranged eccentrically) is rotatably supported within the field magnet.

In FIG. 9, four magnets for forming a 4-pole magnetic field are embedded at respective corner portions of the square yoke having beveled corners. A rotor is disposed radially inward of the magnets and is rotatably supported.

In order to improve productivity of small-sized motors, desirably, a field magnet is manufactured separately from a yoke and is then assembled with the yoke. However, in the case of the motor configuration shown in FIG. 8, making the field magnet fit corner portions of the yoke is not easy. Usually, such assembly employs a press-fit technique. However, in order to enable press-fit of the field magnet, a clearance must be provided between the field magnet and the yoke at the apexes of magnetic poles of the field magnet. Since the intensity of magnetic field must be enhanced particularly at the apexes of magnetic poles of the field magnet, the presence of such clearances causes a drop in motor performance. The shape of the field magnet is disadvantageous in that corner portions thereof fail to effectively function in relation to the rotor poles and that the weight and volume of the field magnet are increased, thereby causing a direct increase in cost.

The method of fixing the magnets through embedment in the yoke as shown in FIG. 9 involves the following problems: corner portions of the yoke are increased in thickness, so that the required amount of material is increased; and the complicated shape of the yoke causes an increase in the cost of machining a mold for the yoke. Also, insertion of the magnets may cause cracking of the yoke. Furthermore, a bonding process using an adhesive is required, and time for drying the adhesive is required as well.

SUMMARY OF THE INVENTION

An object of the present invention is to provide a small-sized motor having a polygonal outer shape which employs the polygonal outer shape in view of whirl-stop thereof and space efficiency and whose size can be reduced without involvement of a drop in performance thereof through reduction in weight and volume of a field magnet and efficient arrangement thereof.

Another object of the present invention is to provide a small-sized motor having a polygonal outer shape whose performance is improved through effective functioning of magnetic flux of a field magnet and whose productivity is enhanced through easy attachment of the field magnet into the yoke.

A small-sized motor having a polygonal outer shape of the present invention is configured such that four or more field magnets are attached to the inner surface of a motor casing made of metal. A tubular portion of the motor casing is formed into a polygonal tubular shape such that flat side portions equal in number to field poles, and flat or curved corner portions equal in number to the field poles and each being located between the adjacent side portions are sequentially joined together. The field magnets have a smaller thickness at portions corresponding to the side portions of the motor casing and a larger thickness at portions corresponding to the corner portions of the motor casing. The field magnets are fixed while coinciding in center position with the corresponding corner portions of the motor casing and while being pressed against the corresponding corner portions of the motor casing from inside. A clearance is formed between the field magnets and the corresponding side portions of the motor casing.

The plurality of field magnets are integrated into a ring magnet whose portions corresponding to the side portions of the motor casing have a smaller thickness and whose portions corresponding to the corner portions of the motor casing have a larger thickness, and the ring magnet is fixedly press-fitted into the motor casing. Alternatively, the plurality of field magnets are separately formed, and, by utilization of pins of a spring material and/or projections provided on the motor casing, the field magnets are fixed while being pressed against the corresponding corner portions of the motor casing from inside.

According to the present invention, the side portions of the motor casing (yoke) are formed flat, thereby providing a whirl-stop function at the time of mounting of the motor, and also reducing wasted space around the motor with a resultant improvement of space efficiency. Furthermore, since the field magnets are supported by the corner portions of the yoke, opposite ends of the individual side portions of the motor casing are pulled, whereby the rigidity of the side portions of the motor casing is enhanced; thus, vibration of the motor casing can be suppressed during rotation of the motor.

The field magnets are nonuniform in thickness such that the magnetic flux smoothly reduces, at their side portions, with a circumferential distance from their circumferential centers, whereby cogging torque can be lowered. Through employment of nonuniform thickness, the field magnets have at their circumferential centers such a thickness as to generate a magnetic field of sufficiently high intensity. Also, since the field magnets are pressed closely against the yoke at their circumferentially central portions, the intensity of magnetic field can be enhanced, thereby improving motor performance. Furthermore, clearances are formed between the field magnets and the side portions of the yoke so as to form air layers, whereby leakage of noise can be prevented.

DETAILED DESCRIPTION OF THE PREFERRED EMBODIMENTS

Figure 1:
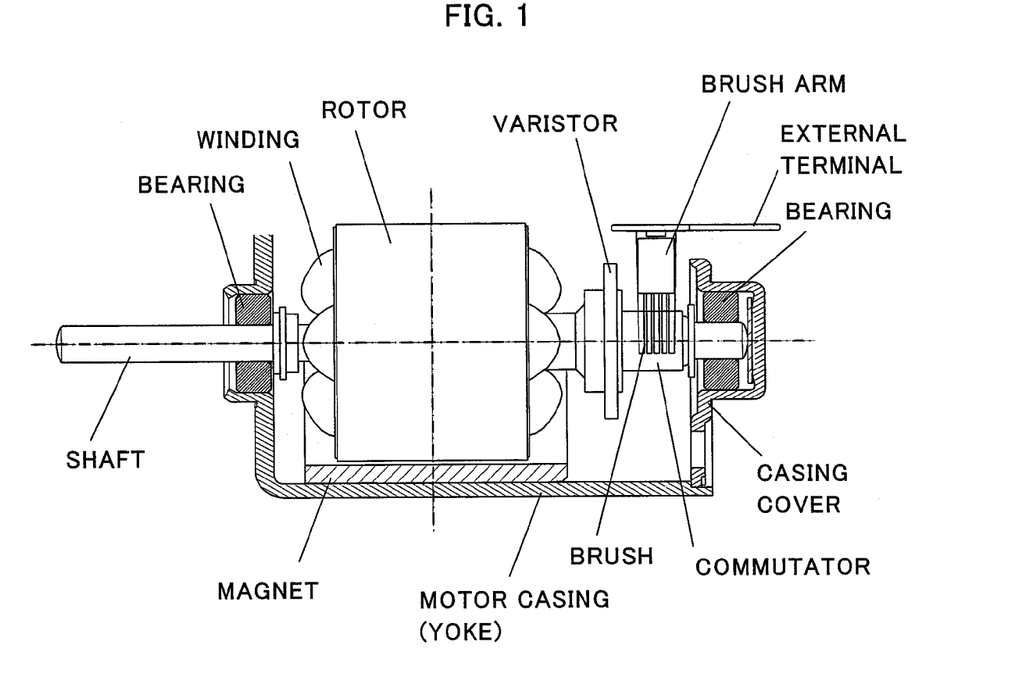
FIG. 1 is a partially sectional view showing the configuration of a small-sized motor having a polygonal outer shape according to an embodiment of the present invention.
Figure 2:
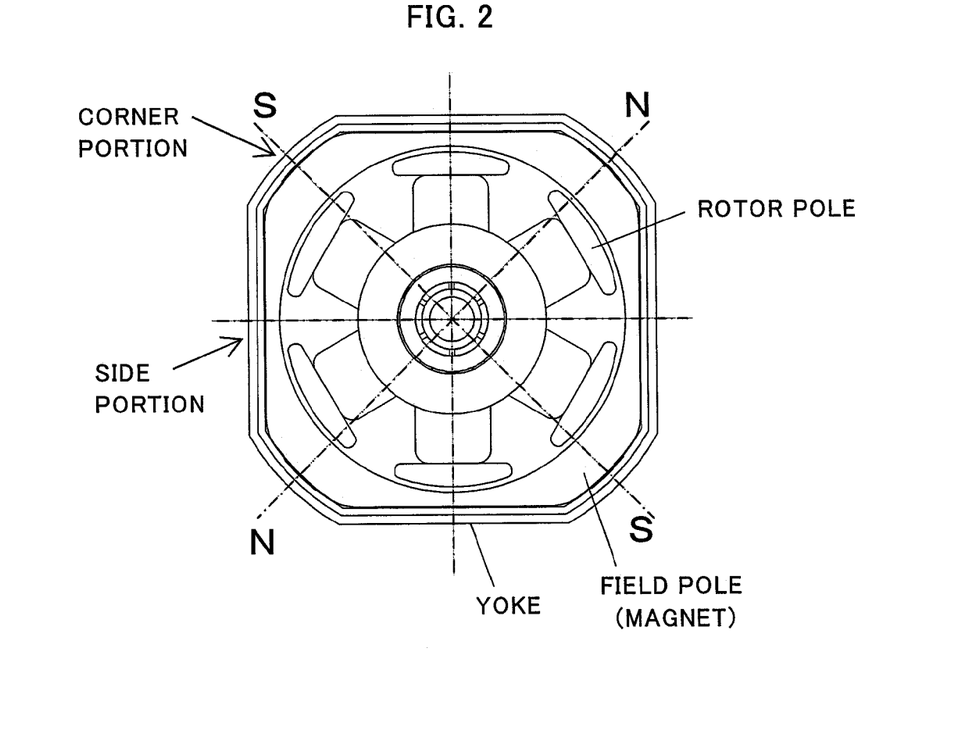
FIG. 2 is a side view of the motor of FIG. 1 as viewed from a commutator side with a casing cover being removed.

Embodiments of the present invention will next be described in detail with reference to the drawings. FIG. 1 is a partially sectional view showing the configuration of a small-sized motor having a polygonal outer shape according to an embodiment of the present invention; and FIG. 2 is a side view of the motor of FIG. 1 as viewed from a commutator side with a casing cover being removed. The following description discusses a small-sized motor having four field magnets and six rotor poles. However, the present invention can be applied to a small-sized motor having four or more field poles, such as four, six, or eight field poles, and three or more rotor poles.

As shown in FIGS. 1 and 2, a magnet is attached, from inside, to a motor casing, which is formed from a metal material into a closed-bottomed tubular shape by press working. A polygonal tubular portion of the motor casing of metal is a yoke, which serves as a magnetic path of the magnet. A casing cover is fitted to an opening portion of the motor casing. A shaft of a rotor is supported by bearings provided respectively at a central portion of the casing cover and at the center of a bottom portion of the motor casing. A rotor configured on the shaft includes a rotor pole configuration, which is composed of a pole core and windings wound on the pole core. A commutator is fixed on the shaft and has a varistor at an end portion thereof for quenching sparks. Brushes (paired) in contact with the commutator are supported by the casing cover via respective brush arms and are externally supplied with power via respective external terminals.

Figures 3A, 3B:
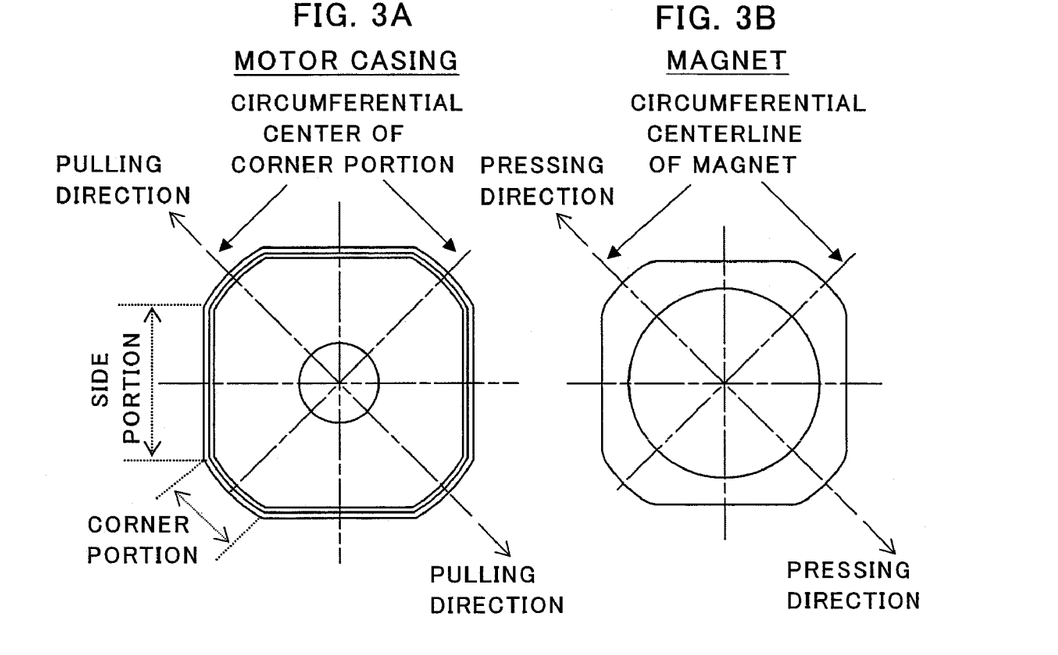
FIGS. 3A and 3B are side views of a motor casing and a magnet, respectively.

FIGS. 3A and 3B are side views of the motor casing and the magnet, respectively. The magnet is radially magnetized and has four poles such that the south pole and the north pole alternate in the circumferential direction. The magnet illustrated here is unitarily formed from a magnet material and assumes a ring shape. This ring magnet has an inside diameter slightly greater than the outside diameter of the rotor and has nonuniform thickness such that side portions thereof are thin-walled, whereas corner portions thereof are thick-walled. The ring magnet can be formed as follows. A magnetic material is formed into a ring shape having nonuniform thickness. The ring-shaped magnetic material is fixed into the motor casing.

Then, by use of a magnetic-field generator, the ring-shaped magnetic material is magnetized to a 4-pole magnet from outside the motor casing.

As shown in FIG. 3A, a tubular portion of the motor casing, which serves as a yoke, is configured such that flat side portions equal in number to field poles (four side portions), and corner portions equal in number to the four field poles (four corner portions) and each being located between the adjacent side portions are sequentially joined together. As will be described later, the corner portions support the ring magnet at their inner sides and are flat or curved. Since the side portions of the motor casing are formed flat, a whirl-stop function effective during mounting of the motor is provided, and also wasted space around the motor is reduced, thereby improving space efficiency.

As shown in FIG. 2, the respective circumferential center positions of magnet sections (apexes of the field poles) coincide with those of the corner portions of the yoke. The magnet sections are magnetized radially and such that the adjacent magnet sections differ in magnetic pole; i.e., such that the south pole and the north pole alternate in the circumferential direction.

Figure 4:
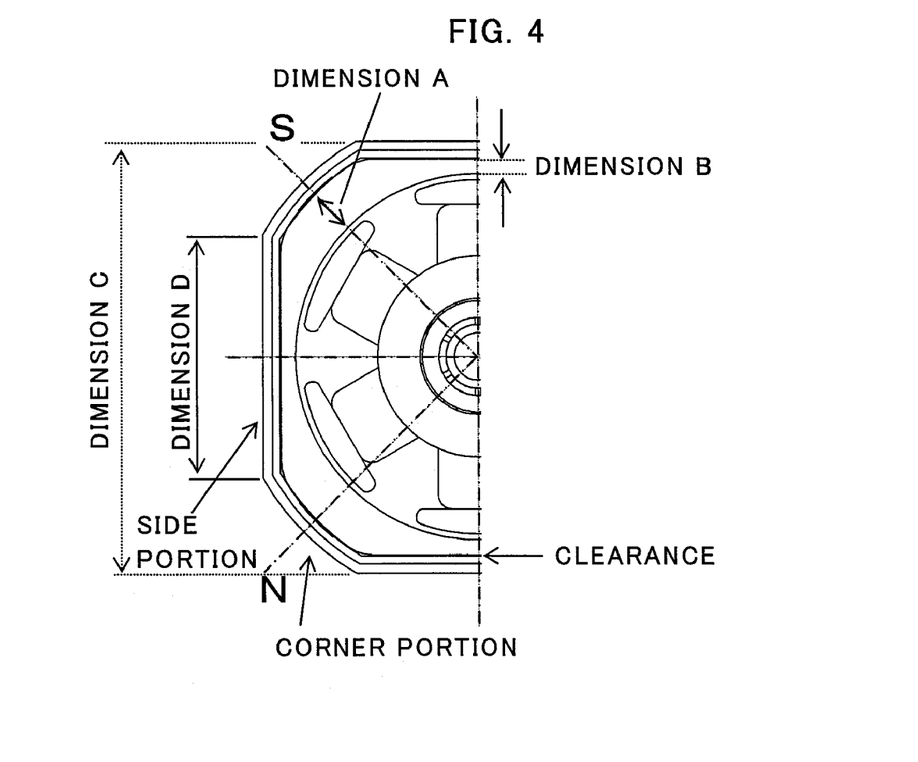
FIG. 4 is a view equivalent to the left half of FIG. 2.

With reference to FIG. 4, the shape of the magnet will be described. FIG. 4 is equivalent to the left half of FIG. 2. The magnet sections each have a substantially constant radial thickness (dimension A) as measured at any circumferential position corresponding to the corresponding corner portion of the yoke. When each corner portion is curved along an arc whose center is the axis of rotation of the motor, each magnet section has a constant radial thickness. However, each magnet section does not necessarily have a completely constant thickness. Thus, each corner portion can be curved differently from the arc whose center is the axis of rotation of the motor, or can be flat.

The magnet sections reduce in radial thickness (dimension B) toward the adjacent magnetic poles as measured at their portions other than those corresponding to the corner portions of the yoke, so as to be compatible with the flat side portions of the yoke. A small clearance is formed between the magnet sections and the side portions of the yoke; i.e., the magnet sections are not in contact with the side portions of the yoke. The magnet sections are integrated into a ring magnet. The ring magnet has an inside diameter slightly greater than the outside diameter of the rotor and is formed such that its portions corresponding to the side portions of the yoke are thin-walled, whereas its portions corresponding to the corner portions of the yoke are thick-walled. No pressing force acts between the yoke and the thinnest side portions of the ring magnet, thereby preventing cracking or breakage of the ring magnet. The ring magnet is shaped such that the ring magnet is in contact with the yoke only at their corner portions and such that a slight clearance is formed between the ring magnet and the yoke at their side portions, or at least no pressing force acts between the ring magnet and the yoke at their side portions. Thus, the ring magnet can be fixed in the yoke through press fit. The ring magnet is press-fitted into the yoke such that its corner portions are surface-press-fitted to the corner portions of the yoke. By this procedure, the opposite ends of the individual side portions of the yoke are pulled, thereby enhancing the rigidity of the side portions of the yoke. Thus, vibration of the motor casing can be suppressed during rotation of the motor. Also, the ring magnet is not in contact with the yoke at their side portions, thereby forming air layers which prevent leakage of noise.

As mentioned above, the magnet sections are nonuniform in thickness such that the magnetic flux smoothly reduces, at their side portions, with a circumferential distance from their circumferential centers, whereby cogging torque can be lowered. Through employment of nonuniform thickness, the magnet sections have at their circumferential centers such a thickness as to generate a magnetic field of sufficiently high intensity. Also, since the magnet sections are pressed closely against the yoke at their circumferentially central portions, the intensity of magnetic field can be enhanced, thereby improving motor performance.

Figure 5:
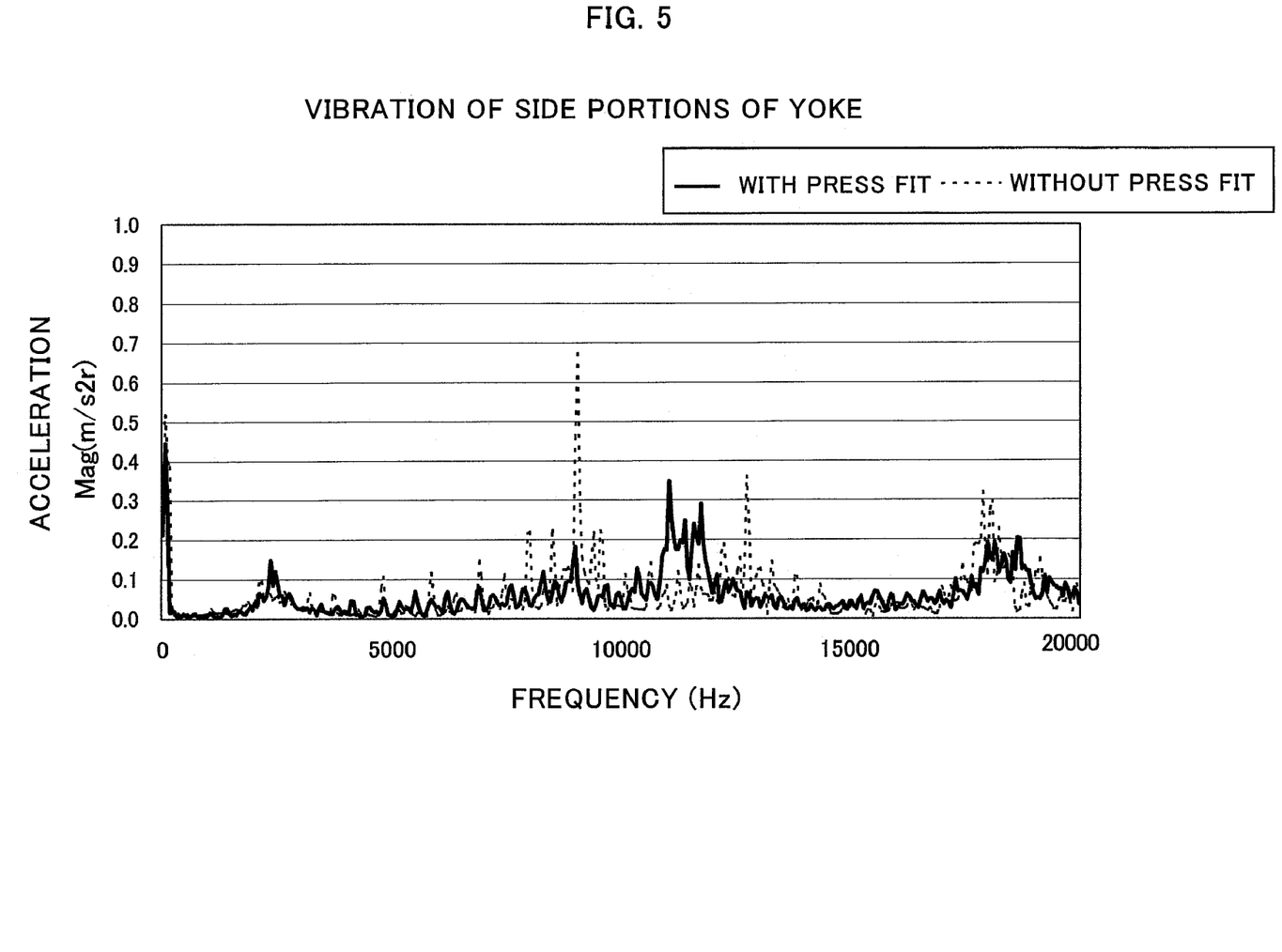
FIG. 5 is a graph for explaining the effect of press fit of the magnet.

With reference to FIG. 5, the effect of press fit of the ring magnet will be described. The graph of FIG. 5 shows the results of measurement of vibration of the side portions of the yoke with respect to the motor (see FIG. 2) in which the ring magnet is attached with press fit as well as the motor (see FIG. 7) in which the magnets are attached without press fit. The horizontal axis of the graph represents the frequency of vibration, and the vertical axis represents vibration by acceleration. As is apparent from the graph, in contrast to the conventional motor without press fit as represented in the graph by the dotted line, the motor with press fit of the present invention as represented by the solid line yields the effect of lowering vibration.

With reference to FIG. 4, the corner portions of the yoke will be described. Dimension C in FIG. 4 is a vertical (or horizontal) dimension of the cross section of the motor having a square outer shape. Dimension D is of the side portion of the yoke. As mentioned above, the corner portions of the yoke support the ring magnet in radial directions. Therefore, the circumferential dimension of the corner portion cannot be reduced greatly. Increasing the percentage of the corner portions means a decrease in the percentage of the side portions, thus marring the advantage of a polygonal motor. The percentage of dimension D to dimension C is desirably 95% or less and 5% or more.

Figure 6A:
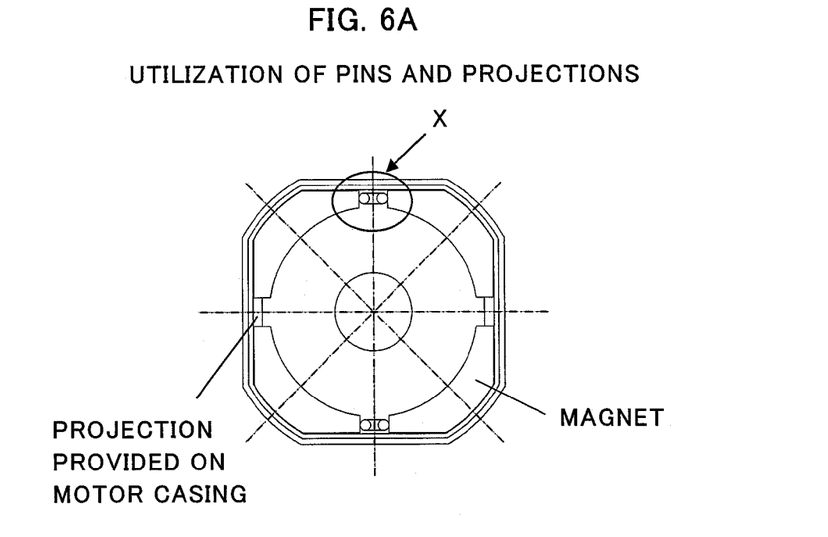
FIGS. 6A to 6C are views for explaining separately formed magnets.
Figure 6B:
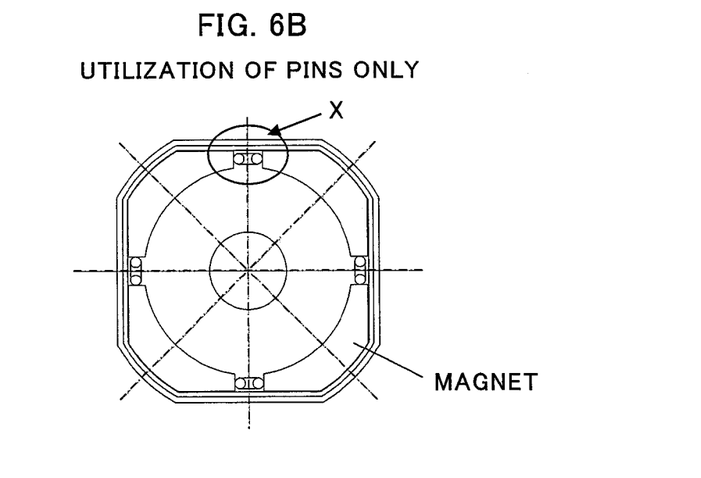
Figure 6C:
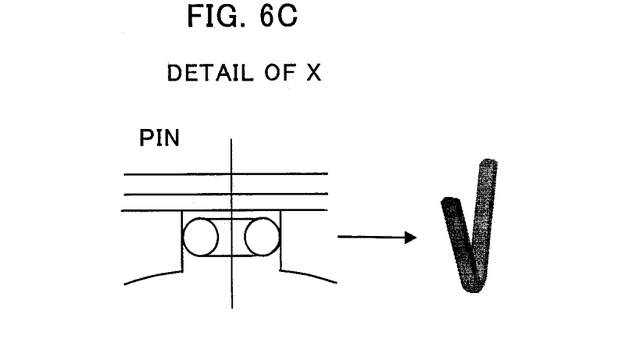

A unitarily formed ring magnet having nonuniform thickness has been described; however, separately formed magnets can be attached into the motor casing. FIGS. 6A to 6C are views for explaining four separately formed magnets, wherein FIG. 6A is a view showing a method of fixing the magnets through utilization of pins, and projections provided on the motor casing; FIG. 6B is a view showing a method of fixing the magnets through utilization of the pins only; and FIG. 6C is a view showing the detail of X in FIGS. 6A and 6B. In FIG. 6C, a sectional view of the pin is at the left, and a perspective view of the pin is at the right.

The configurations shown in FIGS. 6A to 6C differ from the above-described configuration (FIG. 2) in the shape of a magnet and in means for attaching the magnet. Four magnets corresponding to four field poles are separately formed. In FIG. 6A, the four magnets are fixed through utilization of two pins and two projections. In FIG. 6B, the four magnets are fixed through utilization of four pins only. As shown in detail in FIG. 6C, the pin can be formed by forming a rod of spring material into a shape resembling, for example, the letter U. The projections can be integrally formed on the inner surface of the motor casing at predetermined positions. Desirably, the projection has a rectangular cross section so as to support the magnets on its opposite sides and extend along the overall axial length of the magnets.

Through use of the pins and projections, through use of the pins only, or through use of the projections only, the magnets can be fixed while being strongly pressed against the corner portions of the yoke as in the case of above-described attachment of the ring magnet having nonuniform thickness. Thus, similarly, the effect of lowering vibration of the side portions of the yoke is yielded.

By means of imparting nonuniform thickness to the magnet, the small-sized motor of the present invention can attain compatibility between improvement in performance and a reduction in cogging torque, which conventionally conflict with each other. This will be further described by comparison with the prior art with reference to FIGS. 10, 11A, and 11B. FIG. 10 shows, in section, a conventional small-sized motor having a circular (round) outer shape in contrast to the small-sized motor of the present invention. As mentioned previously, the ring magnet of the present invention is nonuniform in thickness such that its corner portions have a substantially constant, larger thickness (dimension A), whereas its side portions have a smaller thickness (dimension B) (see FIG. 4). By contrast, the field magnet shown in FIG. 10A has a constant thickness along the circumferential direction.

Figure 10B:
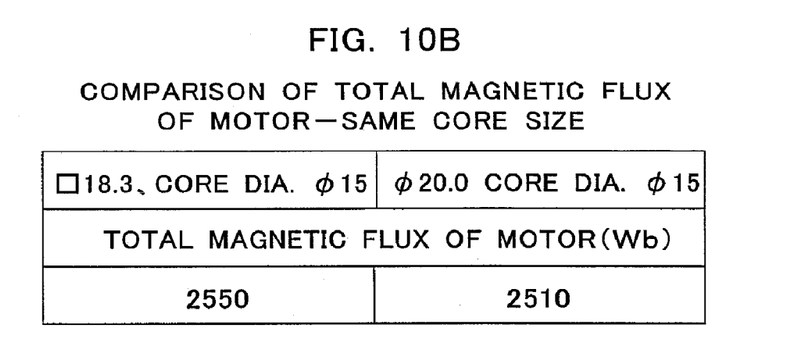
FIG. 10B is a table comparing total magnetic flux between the small-sized motor of the present invention and the conventional small-sized motor of FIG. 10A, both motors having the same core diameter.

The table of FIG. 10B shows the results of comparison of total magnetic flux between the small-sized motor of the present invention and the conventional small-sized motor of FIG. 10A. In FIG. 10B, "☐18.3" indicates that the motor having a square outer shape (the motor of the present invention) has a thickness (dimension C; see FIG. 4) of 18.3 mm, and "φ20.0" indicates that the motor having a round outer shape (the conventional motor) has a diameter (dimension E) of 20.0 mm. "Core dia. φ15" indicates that the rotor-pole core diameter is 15 mm. Both motors have the same core diameter. As is apparent from the table of FIG. 10B, the motor of the present invention exhibits an improvement of about 2% in terms of total magnetic flux generated by the magnet as compared with the conventional motor, but can be reduced in diametral thickness to 18.3 mm as compared with a diametral thickness of the conventional round motor of 20.0 mm.

Figure 10C:
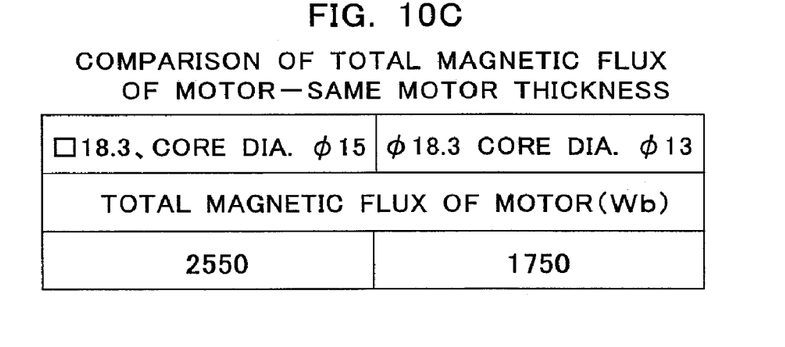
FIG. 10C is a table comparing total magnetic flux between the small-sized motor of the present invention and the conventional small-sized motor of FIG. 10A, both motor having the same outside dimension.

The table of FIG. 10C shows the results of comparison of total magnetic flux generated by the magnet between the motor having a square outer shape (the motor of the present invention) and the motor having a round outer shape (the conventional motor) under the condition that the thickness (dimension C) of the motor of the present invention and the diameter (dimension E) of the conventional motor are both 18.3 mm. As is apparent from the table of FIG. 10C, the motor of the present invention exhibits an increase of 30% in terms of total magnetic flux as compared with the conventional round motor, and the usable rotor-pole core diameter can be increased. Increasing the core diameter increases the wire area of the core, so that counter electromotive force increases further. That is, as compared with the conventional round motor having equivalent performance, the motor of the present invention can be halved in weight and volume; specifically, can reduce the amount of usage of magnet material by 10% and can reduce the motor diameter by 8.5%.

Figure 11A:
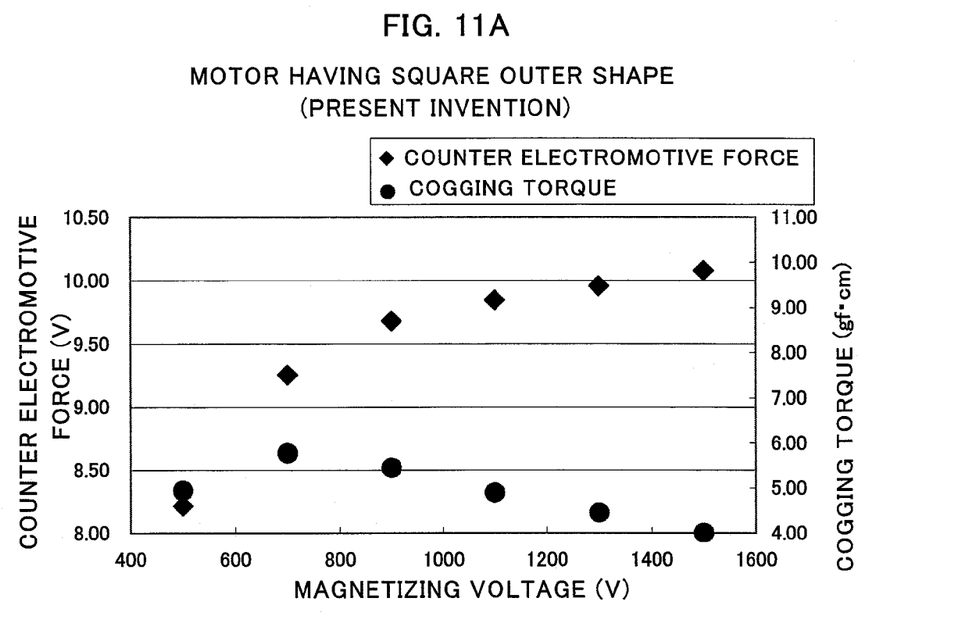
FIGS. 11A and 11B are graphs for comparing performance between the motor having a square outer shape (present invention) and a motor having a round outer shape (prior art)
Figure 11B:
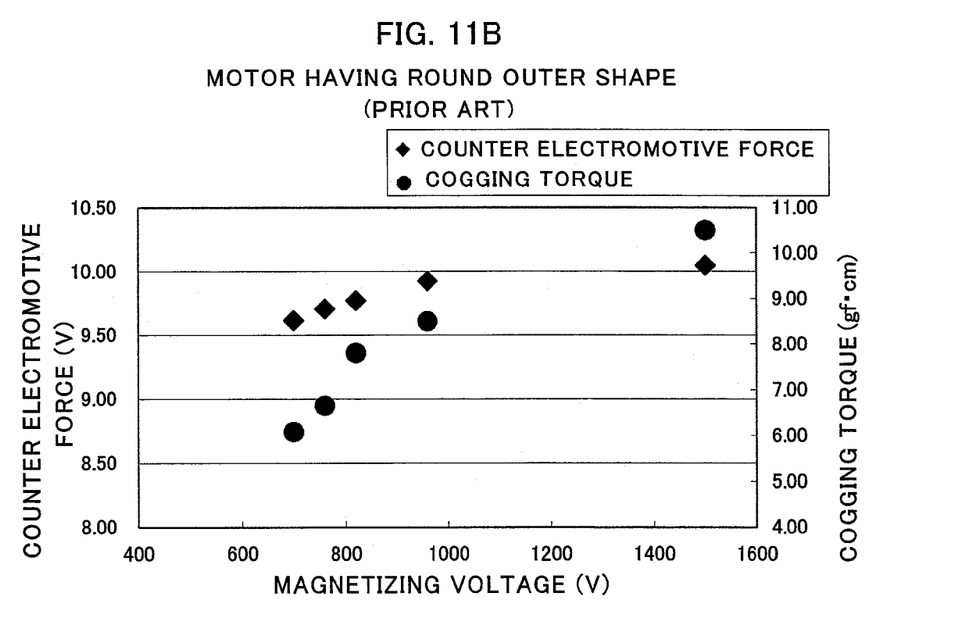

FIGS. 11A and 11B are graphs for comparing performance between the square motor of the present invention having dimensions shown in FIG. 10B and the conventional round motor having dimensions shown in FIG. 10B. In the graphs of FIGS. 11A and 11B, the horizontal axis represents magnetizing voltage, and the vertical axis represents counter electromotive force (V) and cogging torque (gf·cm). As counter electromotive force increases, torque increases, and the rotational speed can be lowered. Magnetizing voltage is a voltage that is applied to a magnet material which is formed into a predetermined shape and fixed within the motor casing, from the outside of the motor casing for the purpose of magnetization. For example, in the case where a magnet magnetized at a voltage of 1,500 V is used, the motor of the present invention exhibits a cogging torque of 4.0 gf·cm, which is a drop of 60% or more from a cogging torque of 10.5 gf·cm of the conventional motor, without drop in performance (with substantially the same counter electromotive force being exhibited).

Figure 12:
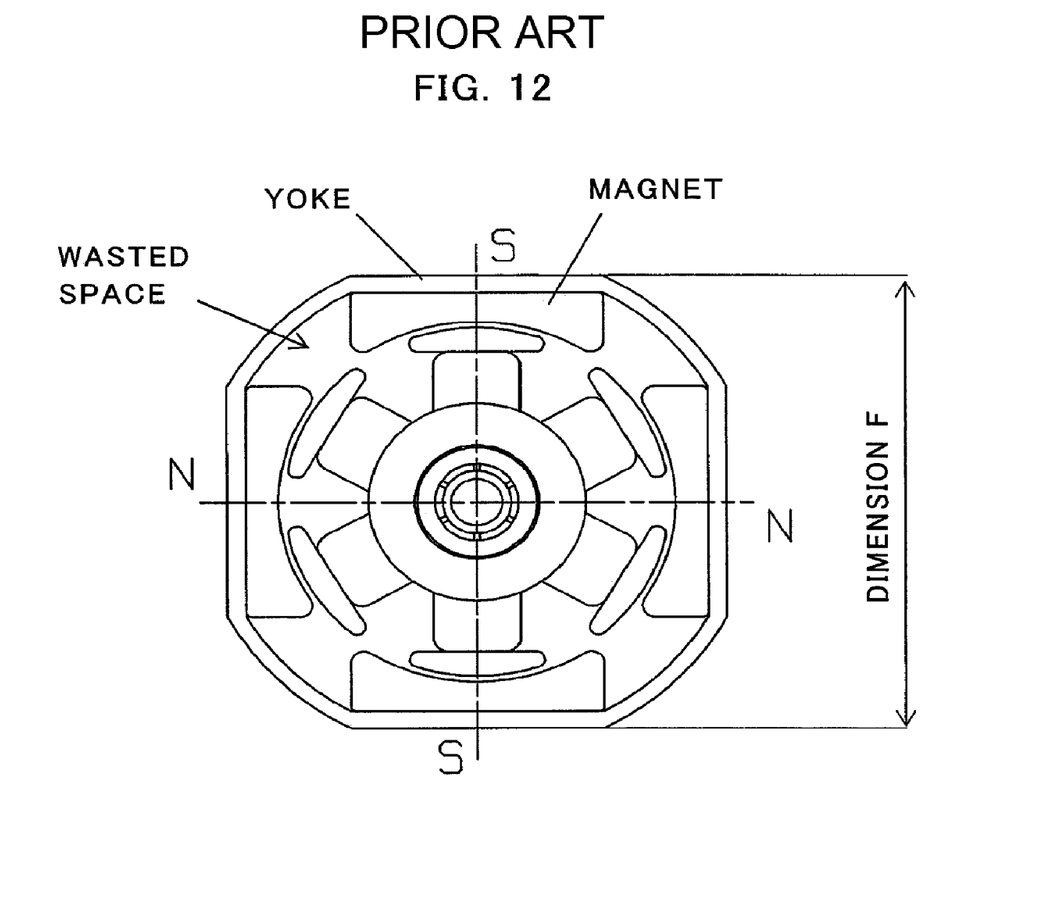
FIG. 12 is a sectional view of a conventional small-sized motor having a square outer shape for comparison with the small-sized motor of the present invention.

FIG. 12 shows, in section, a conventional small-sized motor having a square outer shape for comparison with the small-sized motor of the present invention. For comparison with the motor of the present invention, the motor of FIG. 7 is modified so as to have four field poles and six rotor poles. As described above, the field magnets of the motor are attached to the respective flat side portions of the yoke. Therefore, each magnet must be nonuniform in thickness such that it is inefficiently thick-walled at its circumferentially opposite side portions, instead of its circumferentially central portion, which must generate the maximum magnetic flux. Also, wasted space is formed. Thus, under the same conditions in terms of performance and the amount of usage of magnet material, the thickness (dimension F) of the motor of FIG. 12 increases to 19.4 mm from 18.3 mm, which is the thickness (dimension C) of the motor of the present invention of FIG. 2.

What is claimed is:

1. A small-sized motor having a polygonal outer shape in which four or more field magnets are attached to an inner surface of a motor casing made of metal, comprising:
    a tubular portion of the motor casing being formed into a polygonal tubular shape such that flat side portions equal in number to field poles, and curved corner portions equal in number to the field poles and each curved corner portion being located between the adjacent side portions are sequentially joined together, said each curved corner portion being curved along an arc whose center is an axis of rotation of the motor;
    a dimension C is defined as a vertical or horizontal dimension of the cross-section of the motor, and a dimension D is defined as a dimension of each of the flat side portions, a percentage of dimension D to dimension C is between 5% and 95%; and
    the field magnets each having a larger thickness at portions corresponding to the corner portions of the motor casing, and a smaller thickness gradually decreasing from the larger thickness portions toward circumferentially opposite ends, wherein the field magnets coincide in center position with the corresponding corner portions of the motor casing.

2. A small-sized motor having a polygonal outer shape according to claim 1, wherein the field magnets are fixed while being pressed against the corresponding corner portions of the motor casing from inside.

3. A small-sized motor having a polygonal outer shape according to claim 1, wherein:
    the plurality of field magnets are integrated into a ring magnet whose portions corresponding to the side portions of the motor casing have a smaller thickness and whose portions corresponding to the corner portions of the motor casing have a larger thickness; and
    the ring magnet is fixedly press-fitted into the motor casing.

4. A small-sized motor having a polygonal outer shape according to claim 3, wherein a clearance is formed between the field magnets and the corresponding side portions of the motor casing.

5. A small-sized motor having a polygonal outer shape according to claim 1, wherein:
    the plurality of field magnets are separately formed; and
    by utilization of pins of a spring material and/or projections provided on the motor casing, the field magnets are fixed while being pressed against the corresponding corner portions of the motor casing from inside.

6. A small-sized motor having a polygonal outer shape according to claim 1, wherein:
    portions of the magnets corresponding to said corner portions each have a substantially constant radial thickness as measured at any circumferential position corresponding to the corresponding corner portion.

7. A small-sized motor having a polygonal outer shape in which four or more field magnets are attached to an inner surface of a motor casing made of metal, the motor comprising:
- a tubular portion of the motor casing being formed into a polygonal tubular shape such that flat side portions equal in number to field poles, and curved corner portions equal in number to the field poles and each curved corner portion being located between the adjacent side portions are sequentially joined together, said each curved corner portion being curved along an arc whose center is an axis of rotation of the motor;
- a dimension C is defined as a vertical or horizontal dimension of the cross-section of the motor, and a dimension D is defined as a dimension of each of the flat side portions, a percentage of dimension D to dimension C being between 5% and 95%;
- the field magnets each have an approximately constant radial thickness at portions corresponding to the corner portions of the motor casing, wherein by utilization of a pressing member provided on the motor casing, the field magnets are fixed while being pressed against the corresponding corner portions of the motor casing from inside.

8. A motor having a polygonal outer shape, the motor comprising:
- a motor casing having a polygonal tubular shape with flat side portions, said motor casing having corner portions equal in number to the field poles, each said corner portion being located between said adjacent side portions, said each corner portion being curved along an arc whose center is an axis of rotation of the motor, said motor casing having a dimension C extending from one of said side portions to a diametrically opposite said side portion, each said side portion having a dimension D equal to a length of said side portion, a percentage of dimension D to dimension C being between 5% and 95%;
- a plurality of field magnets arranged in said motor casing corresponding to said side and corner portions, each of said field magnets having a corner portion coinciding with a corresponding said corner portion of said motor casing, said plurality of field magnets having a thickness at side portions corresponding to said side portions of the motor casing and said field magnets having a larger thickness at said corner portions corresponding to said corner portions of said motor casing.

9. A motor in accordance with claim 8, wherein:
said corner portions of said field magnets corresponding to said corner portions of said motor casing are shaped to have a substantially constant radial thickness in said corner portions, said corner portions of said field magnets also being arranged directly against said corresponding corner portion of said motor casing.

10. A motor in accordance with claim 9, wherein:
said corner portions of said field magnets bias said corner portions of said motor casing in a radial outward direction to apply tension to said side portions of said motor casing.

11. A motor in accordance with claim 10, wherein:
said side portions of the motor casing are radially spaced from corresponding side portions of said field magnets.

12. A motor in accordance with claim 8, wherein:
said side portions of the motor casing are radially spaced from corresponding side portions of said field magnets.

13. A motor in accordance with claim 8, wherein:
a radial inner surface of said field magnets is curved along a circle centered on an axis of rotation of the motor and with a substantially constant radius.

14. A motor in accordance with claim 8, wherein:
said each corner portion of said motor casing has an inner surface curved along an arc whose center is the axis of rotation of the motor.

15. A motor in accordance with claim 8, wherein:
a radial outer surface of said corner portions of said magnets is curved along an arc whose center is the axis of rotation of the motor.

16. A motor in accordance with claim 15, wherein:
a radial outer surface of said corner portions of said magnets is curved along an arc whose center is the axis of rotation of the motor, each of said radial outer surfaces of said corner portions of said magnets being in contact with one of said inner surfaces of said corner portions of said motor casing.

17. A motor in accordance with claim 8, wherein:
a radial inner surface and a radial outer surface of said corner portions of said magnets are curved along an arc whose center is the axis of rotation of the motor.

18. A motor in accordance with claim 8, wherein:
said corner portions of said magnet are in contact with said corner portions of said motor casing;
said side portions of said magnet are spaced from said side portions of said motor casing.

* * * * *